J. DENNIS, Jr.
DISSECTED PICTURE AND LETTER-BLOCKS.

No. 171,507. Patented Dec. 28, 1875.

Witnesses:
T. C. Brecht
J. H. Barker

Inventor
J. Dennis Jr.

UNITED STATES PATENT OFFICE.

JONATHAN DENNIS, JR., OF WASHINGTON, DISTRICT OF COLUMBIA.

IMPROVEMENT IN DISSECTED PICTURE AND LETTER BLOCKS.

Specification forming part of Letters Patent No. 171,507, dated December 28, 1875; application filed June 21, 1875.

*To all whom it may concern:*

Be it known that I, JONATHAN DENNIS, Jr., of Washington, in the District of Columbia, have invented certain new and useful Improvements in Dissected Picture and Wood Blocks for Teaching Letters, Words, and Reading; and I hereby declare the following to be a full and exact description thereof, reference being had to the accompanying drawings forming part of this specification.

The nature or essence of my invention consists in so arranging the picture or pictures of objects and the letters that spell the name or names of the same on the blocks that in putting the blocks together to form the picture it shall put in order or together the letters of the alphabet that spell the name of the object represented by the picture on the blocks, and in putting the name of the object within or across the face of the picture.

Figure 1:
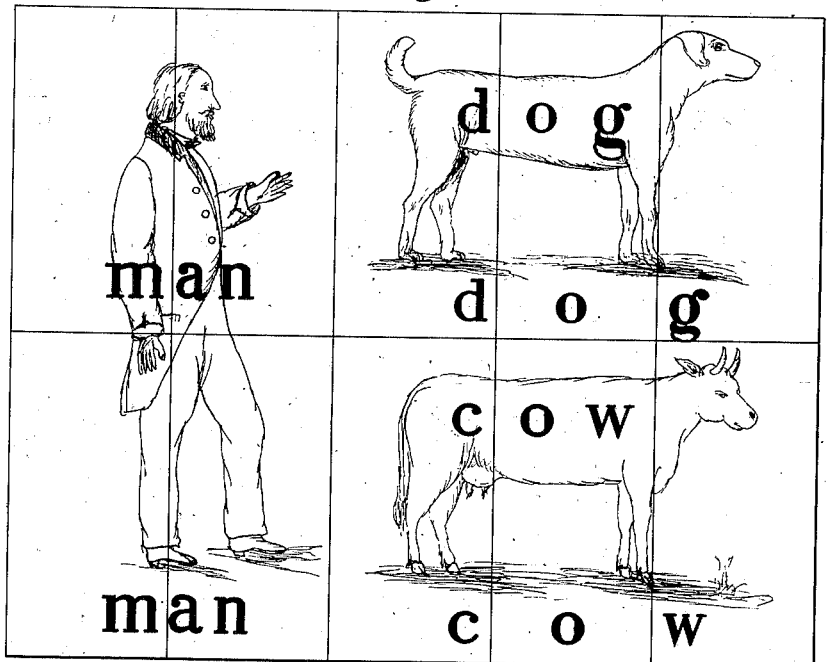

In the accompanying drawings, Figure 1 represents one side of a set of ten picture-blocks, being two blocks high and five blocks wide. Each of the blocks is two and one-half inches long, one and one-fourth inch wide, and five-eighths of an inch thick, the same proportions as the common building-brick.

The first four blocks on the left-hand side have the picture of a man upon them, about one-fourth of the picture being on each block, so that when the four blocks are properly put together they form the whole picture of a man, and the letters of the alphabet which form or spell the word "man" are arranged both under and across the picture on the different blocks, or a part of the letters on each block, so that when the several blocks are put together to form the picture it arranges or puts together the letters of the word "man," which is the name of the picture formed by putting the blocks together.

On the three upper blocks, at the right-hand corner, is the picture of a dog, a part of the dog being on each of the three blocks, and the letters which spell "dog" are arranged on the picture, and also below the picture, one letter on each block, so that when the blocks are put together to form the picture of the dog the letters are arranged to spell the word "dog."

On the three blocks, at the lower right-hand corner, there is the picture of a cow, a part of the cow being on each of the three blocks, and the letters of the alphabet which spell "cow" are arranged on the picture, and also below the picture, one letter on each block, so that the child using the blocks, in arranging them to form the picture of a cow, will also arrange the letters to spell "cow," and thus learn the name, as well as the letters that spell the name, of the object represented by the picture.

Figure 2:
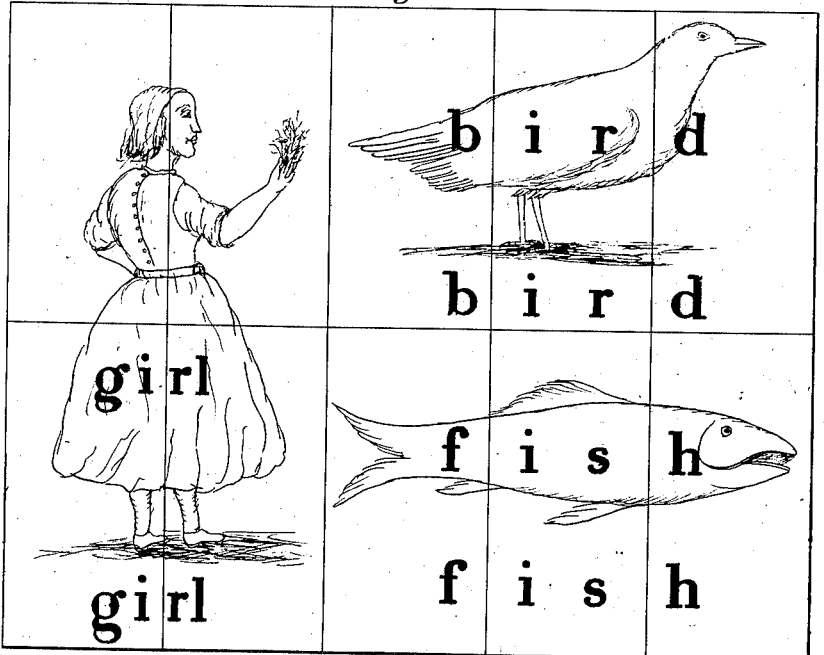

Fig. 2 represents the opposite sides of the blocks. Upon the four blocks which have the picture of a man upon them I make the picture of a girl, and across the picture, as well as below the same, I make the word "girl."

On the opposite sides of the blocks having the picture of the dog I make the picture of a bird, with the word "bird" on the same, and also below it.

On the opposite side of the blocks containing the picture of the cow I make the picture of a fish, with the word "fish" on the picture, and also below it.

I prefer to make the pictures, or the ground around the pictures, on the different sides of the blocks of different colors, to facilitate the arranging of the blocks to form the pictures and spell the words, and where there are several separate and independent sets of pictures put in the same box, to be sold together, it is preferable to have the pictures, or the ground around each set, of a color different from either of the others.

What I claim as my invention is—

1. The dissected picture-blocks, having on each block a portion of the picture, and also a portion of the name of the object represented by the picture, substantially as and for the purpose described.

2. The dissected picture-blocks, having the letters which spell the name of the object represented placed or arranged within or across the face of the picture, substantially as described.

JONATHAN DENNIS, JR.

Witnesses:
ULYSSES G. WHITE.
HENRY H. BARTON.